(12) United States Patent
Wang et al.

(10) Patent No.: US 9,759,859 B2
(45) Date of Patent: Sep. 12, 2017

(54) DISPLAY DEVICE AND MANUFACTURING METHOD THEREOF

(71) Applicant: BOE TECHNOLOGY GROUP CO., LTD., Beijing (CN)

(72) Inventors: Qiangtao Wang, Beijing (CN); Yunsik Im, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/094,009

(22) Filed: Apr. 8, 2016

(65) Prior Publication Data
US 2016/0327734 A1    Nov. 10, 2016

(30) Foreign Application Priority Data

May 5, 2015   (CN) .......................... 2015 1 0223853

(51) Int. Cl.
*F21V 19/04*    (2006.01)
*F21V 8/00*    (2006.01)

(52) U.S. Cl.
CPC ......... *G02B 6/0088* (2013.01); *G02B 6/0065* (2013.01); *G02B 6/0051* (2013.01); *G02B 6/0053* (2013.01); *G02B 6/0056* (2013.01)

(58) Field of Classification Search
CPC .. G02B 6/0088; G02B 6/0051; G02B 6/0056; G02B 6/0053
USPC ................ 362/19, 606, 615, 618, 97.1, 97.2
See application file for complete search history.

(56) References Cited

FOREIGN PATENT DOCUMENTS

| | | |
|---|---|---|
| CN | 1800940 A | 7/2006 |
| CN | 1920634 A | 2/2007 |
| CN | 101165559 A | 4/2008 |
| EP | 2053305 A1 | 4/2009 |
| WO | 2011114180 A1 | 9/2011 |

OTHER PUBLICATIONS

First Office Action dated Apr. 1, 2017 corresponding to Chinese application No. 201510223853.6.

*Primary Examiner* — Vip Patel
(74) *Attorney, Agent, or Firm* — Nath, Goldberg & Meyer; Joshua B. Goldberg

(57) ABSTRACT

Disclosed are a display device and a manufacturing method thereof. The display device includes a display panel and a backlight module, wherein the display panel includes a first display substrate, the backlight module includes a light guide plate and a plurality of optical films, the light guide plate and the first display substrate are subjected to assembling and aligning, and the optical films are packaged between the light guide plate and the first display substrate. The light guide plate and the first display substrate of the display device are packaged together, and the optical films are packaged therebetween, the optical films are laminated to be firmly fixed together to prevent the optical films from being scratched, so no protection layer needs to be arranged in the backlight module, in this way, the thickness of the backlight module is decreased, and the thickness of the display device is decreased beneficially.

15 Claims, 3 Drawing Sheets

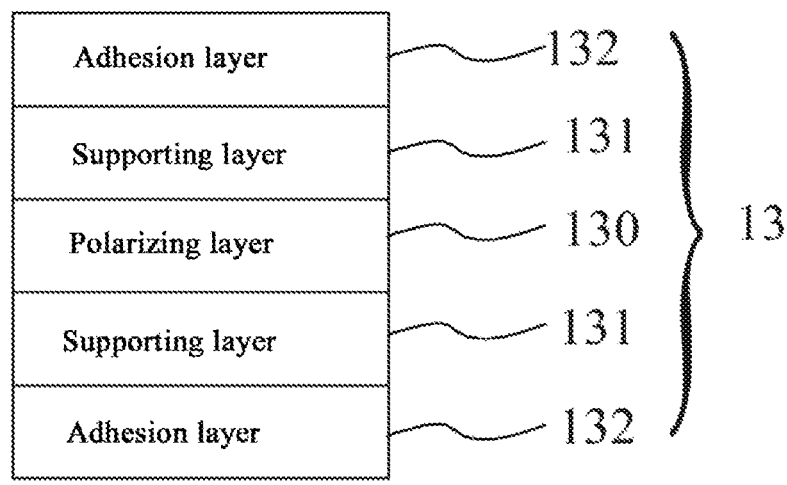
Fig. 1  --PRIOR ART--
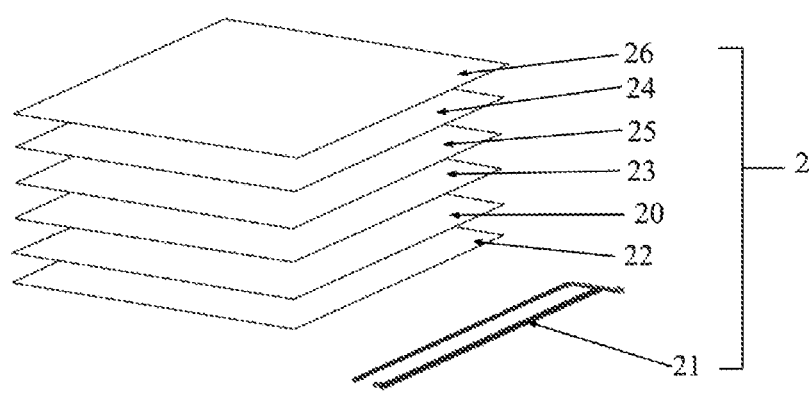
Fig. 2  --PRIOR ART--

DISPLAY DEVICE AND MANUFACTURING METHOD THEREOF

FIELD OF THE INVENTION

The present invention relates to the field of display technology, and in particular, to a display device and a manufacturing method thereof.

BACKGROUND OF THE INVENTION

A liquid crystal display device includes a liquid crystal display panel and a backlight module. Generally, the liquid crystal display panel and the backlight module are fabricate separately, and then the two components are assembled together to obtain the liquid crystal display device.

A liquid crystal display panel generally includes an array substrate and a color filter substrate subjected to assembling and aligning, and a liquid crystal layer filled between the array substrate and the color filter substrate. Wherein, a first polarizer is arranged on an outer side (namely, the side of the array substrate not in contact with the liquid crystal layer) of the array substrate, and a second polarizer is arranged on the outer side (namely, the side of the color filter substrate not in contact with the liquid crystal layer) of the color filter substrate. Specifically, as shown in FIG. 1, a first polarizer 13 includes a polarizing layer 130, supporting layers 131 arranged on both sides of the polarizing layer, and an adhesion layer 132 arranged on the outer side of each supporting layer. The polarizing layer 130 is used for polarizing, the supporting layers 131 are used for supporting the polarizing layer 130, and the adhesion layer 132 is used for adhering the first polarizer 13 on the array substrate and further adhering the first polarizer with the backlight module.

As shown in FIG. 2, a backlight module 2 includes a light source 21, a light guide plate 20, a reflection layer 22 arranged under the light guide plate 20, and a plurality of optical films arranged on the light guide plate 20 in sequence, wherein the optical films specifically includes a diffuser 23, a lower prism film 25 and an upper prism film 24, and a protection layer 26 is arranged on the outer side (opposite side to the light guide plate) of the optical films. The light source 21 is used for emitting light toward the light guide plate 20, and the light guide plate 20 is used for emitting light upwards with said light. The reflection layer 22 is used for reflecting upwards the light heading downwards. The diffuser 23 is used for making the light heading upwards more uniform. The lower prism film 25 and the upper prism film 24 are used for collecting the light heading upwards from the diffuser 23 to a vertical direction to guarantee the view brightness in an angle just opposite to the display device. And the protection layer 26 is used for protecting the optical films located below it to prevent the optical films from being scratched in use.

In the aforementioned liquid crystal display device, the adhesion layers 132 need to be arranged on both sides of the first polarizer 13, and meanwhile, the protection layer 26 needs to be arranged in the backlight module 2, in this way, the thickness of the display device is relatively large.

SUMMARY OF THE INVENTION

An object of the present invention is to provide a display device and a manufacturing method thereof, in order to at least solve the aforementioned technical problems in the prior art, whereby the thickness of the display device can be decreased.

To achieve the object of the present invention, a display device is provided, including a display panel and a backlight module, wherein the display panel includes a first display substrate, the backlight module includes a light guide plate and a plurality of optical films, wherein the light guide plate and the first display substrate are subjected to assembling and aligning, and the optical films are packaged between the light guide plate and the first display substrate.

In the display device according to the present invention, the optical films include a prism film and a diffuser.

The display device further includes a first polarizer. The first polarizer is packaged between the light guide plate and the first display substrate and is located between the first display substrate and the optical films; the first polarizer includes a polarizing layer and supporting layers arranged on both sides of the polarizing layer; and the optical films and the supporting layers are attached and laminated together.

In the display device according to the present invention, the material of the light guide plate is glass.

A layer of optical adhesive is arranged between the first polarizer and the first display substrate.

Preferably, the thickness of the optical adhesive is not less than 10 microns.

Preferably, the thickness of the optical adhesive is not greater than 100 microns.

The present invention further provides a manufacturing method of a display device, including:

fabricating a display panel, wherein the display panel includes a first display substrate;

dripping a sealant along the edge of the first display substrate, and pre-curing the sealant to obtain a sealant framework;

attaching a plurality of optical films in the sealant framework;

assembling and aligning a light guide plate and the first display substrate; and curing the sealant framework to bond the light guide plate and the first display substrate together.

Specifically, the step of attaching the optical films in the sealant framework includes: placing a first polarizer, a prism film and a diffuser in the sealant framework in sequence, and attaching the same together by lamination.

The first polarizer includes a polarizing layer and supporting layers arranged on both sides of the polarizing layer.

The manufacturing method of a display device further includes: before placing the first polarizer in the sealant framework, coating an optical adhesive on the first display substrate.

Preferably, the thickness of the optical adhesive is not less than 10 microns.

Preferably, the thickness of the optical adhesive is not greater than 100 microns.

The sealant includes glass cement. Alternatively, the sealant includes vanadium pentoxide.

The present invention has the following beneficial effects:

The light guide plate and the first display substrate of the display device provided by the present invention are packaged together to package the optical films, so that the optical films are laminated and firmly fixed together. Meanwhile, the optical films will not be scratched; accordingly no protection layer needs to be arranged in the backlight module. In this way, the thickness of the backlight module is decreased, and the thickness of the display device is decreased beneficially.

BRIEF DESCRIPTION OF THE DRAWINGS

The accompanying drawings are meant to provide deeper understanding of the present invention and are used together with the following embodiments to further explain the present invention. It should be understood that, these accompanying drawings constitute a part of the description, but do not limit the present invention. In the accompanying drawings:

FIG. 1 is a schematic diagram of a first polarizer in an existing display device;

FIG. 2 is a schematic diagram of a backlight module of the existing display device;

DESCRIPTION OF EMBODIMENTS

Specific embodiments of the present invention will be illustrated below in detail in combination with the accompanying drawings. It should be understood that, the embodiments described herein are merely used for illustrating and explaining the present invention, rather than limiting the present invention.

Figure 3:
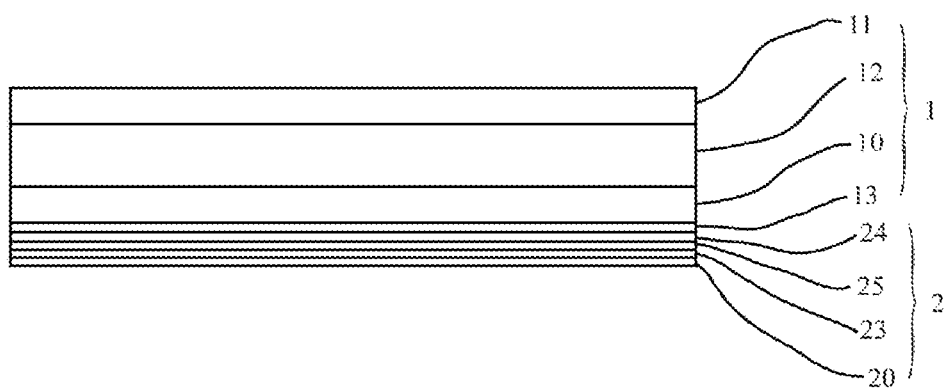
FIG. 3 is a schematic diagram of a display device provided by an embodiment of the present invention.

FIG. 3 is a schematic diagram of a display device provided by an exemplary embodiment of the present invention. As shown in FIG. 3, the display device provided by the embodiment includes a display panel 1 and a backlight module 2; wherein the display panel 1 includes a first display substrate 10, the backlight module 2 includes a light guide plate 20 and a plurality of optical films, the light guide plate 20 and the first display substrate 10 are subjected to assembling and aligning, and the optical films are packaged between the light guide plate 20 and the first display substrate 10.

Besides the first display substrate 10, the display panel 1 may further include a second display substrate 11 subjected to assembling and aligning with the first display substrate 10, and a liquid crystal layer 12 filled between the first display substrate 10 and the second display substrate 11. In general, the first display substrate 10 is an array substrate, and the second display substrate 11 is a color filter substrate. In the aforementioned situation, the first display substrate 10 is assembled and aligned with the second display substrate 11, as well as the light guide plate 20. In the embodiment, preferably, the first display substrate 10 is assembled and aligned with the second display substrate 11 first, then liquid crystal is filled therebetween to obtain the display panel 1, and then an outer side (namely, the side of the substrate not in contact with the liquid crystal layer) of the first display substrate 10 in the display panel 1 is assembled and aligned with the light guide plate 20.

As shown in FIG. 2, besides the aforementioned light guide plate 20 and the optical films, the backlight module 2 may further include the light source 21 and the reflection layer 22 as described in the background part. In the embodiment, the optical films are located on the light guide plate 20 (the side where the reflection layer 22 is located is under the light guide plate 20), the optical film includes prism films 24, 25 and a diffuser 23. The diffuser 23 is used for making the light irradiated upwards (namely, the direction where the first display substrate 10 is located) from the light guide plate 20 more uniform; the prism films are used for collecting the light irradiated from the diffuser 23 to a direction vertical to the first display substrate 10 and irradiating the light; and specifically, the prism films may include an upper prism film 24 and a lower prism film 25.

In the embodiment, the light guide plate 20 and the first display substrate 10 are subjected to the assembling and aligning, and the optical films are packaged between the light guide plate 20 and the first display substrate 10, namely an assembly process in the prior art is replaced by a package process. In this case, the optical films can be firmly laminated with the first display substrate 10 and the light guide plate 20, no obvious friction will occur therebetween, and thus no protection layer (namely, the protection layer 26 in the prior art) used for protecting the optical films needs to be arranged on the outer sides of the optical films. Compared to the prior art, the embodiment of the present invention decreases the thickness of the display device.

Meanwhile, the package process adopted in the embodiment has a better sealing property than the assembly process in the prior art, in which case, external air can be isolated so that moisture and other substances in the air cannot react with the optical films to lead to change of optical performance of the optical films.

When the light guide plate 20 and the first display substrate 10 are subjected to assembling and aligning, a sealant (glass cement and the like in general) needs to be coated on the first display substrate 10 first, and then the sealant is cured by laser irradiation and other manners, so as to fix the light guide plate 20 and the first display substrate 10 together. In this process, due to the laser irradiation and other processes, the light guide plate 20 needs to resist high temperature and have relatively high stability. Therefore, in the embodiment, the material of the light guide plate 20 is preferably glass so as to avoid damage to the light guide plate 20 during the laser irradiation and other processes. Of course, the material of the light guide plate 20 may also be other materials meeting the requirements of the assembling and aligning process.

Figure 4:
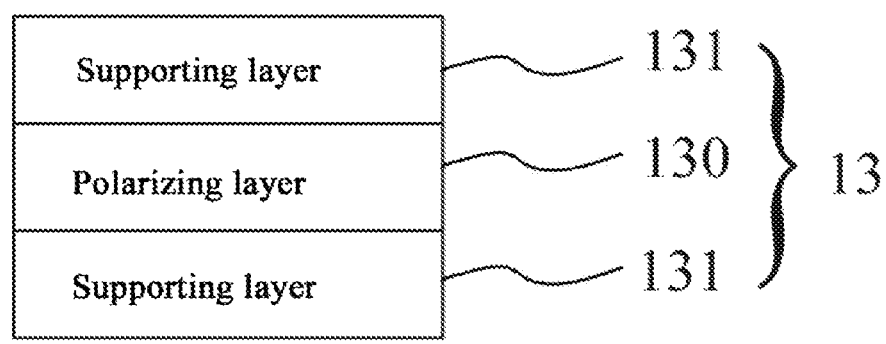
FIG. 4 is a schematic diagram of a first polarizer of the display device as shown in FIG. 3.

Generally, polarizers are arranged on both sides of the display panel. In another embodiment of the present invention, the display device further includes a first polarizer 13, which is arranged on the outer side of the first display substrate 10. In the embodiment, preferably, the first polarizer 13 is packaged between the light guide plate 20 and the first display substrate 10 and is located between the first display substrate 10 and the optical films. In this case, as shown in FIG. 4, the first polarizer 13 may include a polarizing layer 130 and supporting layers 131 arranged on both sides of the polarizing layer 130, and the optical films and the supporting layers 131 are attached and laminated together. Compared to the prior art, the first polarizer 13 does not need to be attached with the first display substrate 10 and the optical films in an adhesion manner, so that the first polarizer 13 can include no adhesion layer 132 in the background part, and thus the thickness of the first polarizer 13 is decreased, thereby being conducive to decreasing the thickness of the display device.

For example, In the existing display devices, the thickness of the polarizer is 0.25 mm, wherein the thickness of the polarizing layer is 50 nm, the thickness of the supporting layers on both sides of the polarizing layer is 40 nm, the thickness of the adhesion layer is 60 nm, and the thickness of the protection layer in the backlight module is 0.1 mm. By using the technical solutions in the embodiments of the present invention, the adhesion layer in the polarizer and the protection layer in the backlight module can be omitted, so the thickness of the display device can be decreased by 0.22 mm.

In the embodiment, preferably, a layer of optical adhesive is arranged between the first polarizer 13 and the first display substrate 10.

Before the first polarizer 13 is placed on the first display substrate 10, the optical adhesive is coated on the first display substrate 10. In this way, when the first polarizer 13 is placed on the first display substrate 10, gaps and bubbles between the first polarizer 13 and the first display substrate 10 are avoided to prevent abnormal refraction and transmission of the light at the gaps and the bubbles, so as to avoid adverse effects on the display performance of the display device. On one hand, the thickness of the optical adhesive is preferably not less than 10 microns, so that the thickness of the optical adhesive can effectively avoid generation of gaps and bubbles; and on the other hand, the thickness of the optical adhesive is preferably not greater than 100 microns, so that the thickness of the optical adhesive is not too large, in order to avoid obvious increase of the thickness of the display device.

According to the display device provided by the embodiment of the present invention, the light guide plate 20 of the display device and the first display substrate 10 are packaged together, and the optical films are packaged therebetween, so that the optical films are laminated to be firmly fixed together to avoid being scratched, so no protection layer needs to be arranged in the backlight module 2. And in this way, the thickness of the backlight module 2 is decreased, which is also conducive to decreasing the thickness of the display device.

Figure 5:
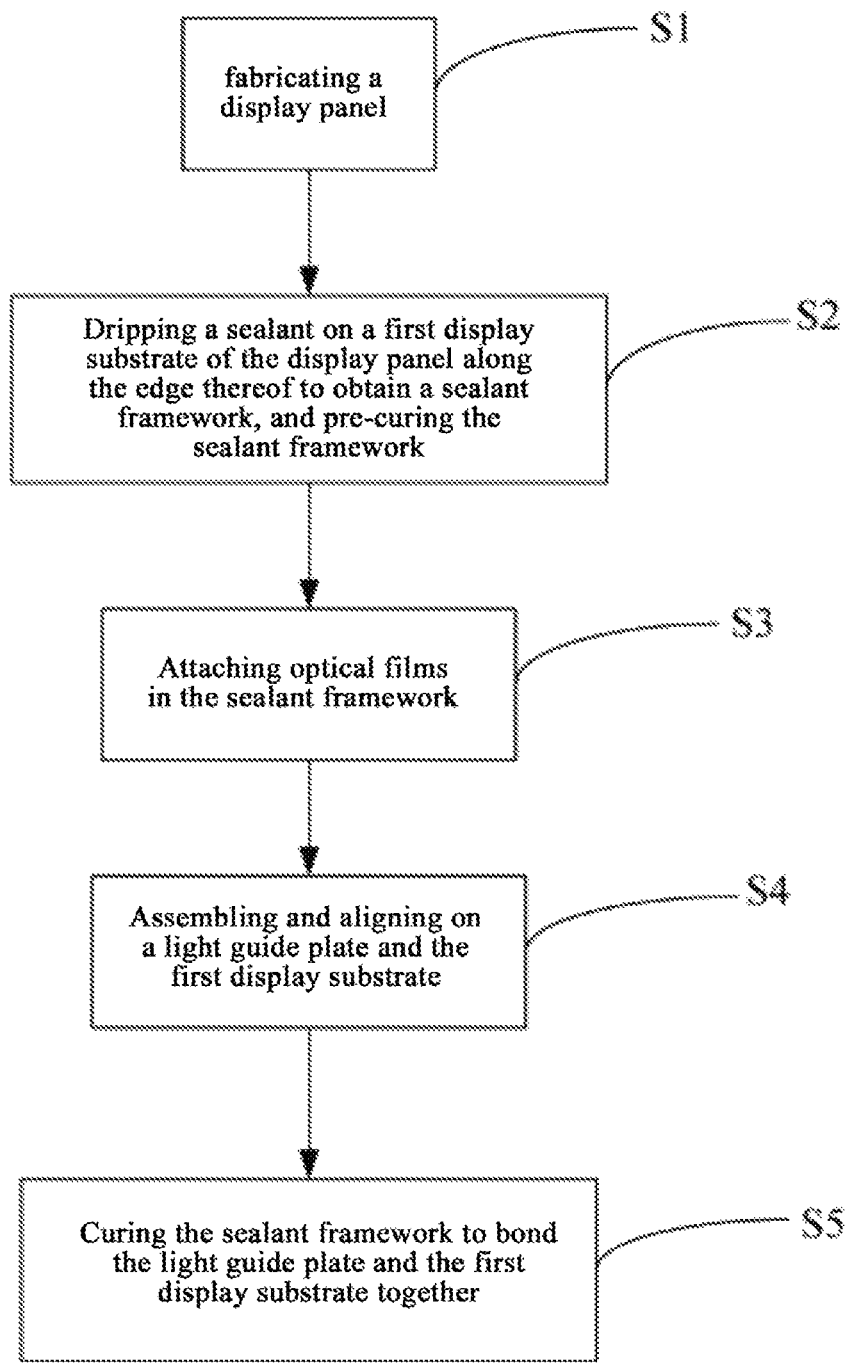
FIG. 5 is a flowchart of a manufacturing method of a display device provided by an embodiment of the present invention.

FIG. 5 is a flowchart of a manufacturing method of a display device provided by an embodiment of the present invention. A manufacturing method of a display device is further provided in another embodiment of the present invention, as shown in FIG. 5, the method includes steps S1 to S5:

S1, fabricating a display panel.

In step S1, assembling and aligning a first display substrate and a second display substrate, and liquid crystal is filled therebetween to obtain the display panel. Before the next step, carrying out processes like cleaning, UV (ultraviolet light) irradiation and others on the display panel, particularly the outer side of the first display substrate.

S2, dripping a sealant on the first display substrate of the display panel along the edge thereof to obtain a sealant framework, and pre-curing the sealant framework.

In step S2, the sealant can be glass cement or a material containing vanadium pentoxide. After the sealant is dripped, the sealant is attached on the glass substrate by sintering and other pre-curing processes. Dust particles of the sealant (particularly when the sealant is a powdery material containing vanadium pentoxide) should be avoided as they may lead to adverse influence in the subsequent processes.

S3, attaching a plurality of optical films in the sealant framework.

In step S3, the optical films are attached in the sealant framework in sequence, and the optical films are fixedly attached together by lamination. For example, an upper prism film, a lower prism film and a diffuser are attached in the sealant framework in sequence and are laminated.

S4, assembling and aligning a light guide plate and the first display substrate.

In step S4, the light guide plate and the first display substrate are aligned and are attached together.

S5, curing the sealant framework to bond the light guide plate and the first display substrate together.

In step S5, the sealant is cured by laser irradiation and other manners, and the cured sealant bonds the light guide plate and the first display substrate together.

In the embodiment, the assembling and aligning is carried out on the light guide plate and the first display substrate, and the optical films are packaged therebetween. In this way, the optical films can avoid being scratched, and no protection layer needs to be arranged in the backlight module of the display device. And in this way, the thickness of the backlight module is decreased, thereby being conducive to decreasing the thickness of the display device.

Preferably, in the step of attaching the optical films in the sealant framework (namely step S3), a first polarizer, a prism film and a diffuser are placed in the sealant framework in sequence and are attached together by lamination. In this way, the first polarizer and the optical films can be attached together by lamination, so that the first polarizer does not need to include an adhesion layer. In this case, the first polarizer can only include a polarizing layer and supporting layers arranged on both sides of the polarizing layer, so that the thickness of the first polarizer is decreased, which is also conducive to decreasing the thickness of the display device.

Optionally, before the first polarizer is placed in the sealant framework (namely before step S3), an optical adhesive is coated on the first display substrate. In this way, when the first polarizer is placed in the sealant framework, the first polarizer is in contact with the optical adhesive. In the placing process, gaps, bubbles and the like are avoided between the first polarizer and the first display substrate, and then abnormal transmission and refraction of light can also be avoided, so as to guarantee a better display performance of the display device. Preferably, the thickness of the optical adhesive is not less than 10 microns, so that the thickness of the optical adhesive can meet the demand of avoiding generation of gaps and the bubbles. On the other hand, the thickness of the optical adhesive is preferably not greater than 100 microns, so that the thickness of the display device is not greatly increased accordingly.

EXAMPLES

Example 1

S1: cleaning an outer side of a first display substrate in a display panel (manufactured by BOE) by deionized water and an Air Knife, and irradiating the outer side of the first substrate by ultraviolet light with a wavelength of 315 nm and illuminance of 0.5 W/cm$^2$;

S2, dripping a sealant ($SiO_2$ glue) on the outer side surface of the first display substrate along the edge thereof, and after the dripping, heating the sealant in a high temperature furnace at 130° C. for 30 min to fix the sealant on a glass substrate;

S3, attaching optical films Pol, Prism up, Prism down, Diffuser and the like in the sealant framework in sequence and laminating to fix the optical films together;

S4, assembling and aligning a light guide plate in a backlight module and the first display substrate to boded them together; and S5, heating the display panel and the backlight module in a high temperature furnace at 180° C. for 90 min to cure the sealant framework, so as to bond the light guide plate and the first display substrate together.

In the existing display devices, the thickness of the adhesion layers on both sides of the polarizing layer is 60 nm, and the thickness of the protection layer in the backlight module is 0.1 mm. By using the technical solutions in the embodiments of the present invention, the adhesion layer in the polarizer and the protection layer in the backlight module can be omitted, so the thickness of the display device can be decreased by 0.22 mm.

It can be understood that, the above embodiments are merely exemplary embodiments used for illustrating the principle of the present invention, but the present invention is not limited thereto. Those of ordinary skill in the art can make a variety of variations and improvements without departing from the spirit and essence of the present invention, and these modifications and improvements also are regarded as falling into the protection scope of the present invention.

The invention claimed is:

1. A display device, comprising a display panel and a backlight module, wherein the display panel comprises a first display substrate, the backlight module comprises a light guide plate and a plurality of optical films, the light guide plate and the first display substrate are subjected to assembling and aligning, and the optical films are packaged between the light guide plate and the first display substrate.

2. The display device of claim 1, wherein the optical film comprises a prism film and a diffuser.

3. The display device of claim 1, wherein the display device further comprises a first polarizer, which is packaged between the light guide plate and the first display substrate and is located between the first display substrate and the optical films;
the first polarizer comprises a polarizing layer and supporting layers arranged on both sides of the polarizing layer; and
the optical films and the supporting layers are attached and laminated together.

4. The display device of claim 3, wherein the material of the light guide plate is glass.

5. The display device of claim 3, wherein a layer of optical adhesive is arranged between the first polarizer and the first display substrate.

6. The display device of claim 5, wherein the thickness of the optical adhesive is not less than 10 microns.

7. The display device of claim 5, wherein the thickness of the optical adhesive is not more than 100 microns.

8. A manufacturing method of a display device, comprising:
preparing a display panel;
dripping a sealant on a first display substrate of the display panel along the edge thereof, and pre-curing the sealant to obtain a sealant framework;
attaching a plurality of optical films in the sealant framework;
assembling and aligning a light guide plate and the first display substrate; and
curing the sealant framework to bond the light guide plate and the first display substrate together.

9. The manufacturing method of a display device of claim 8, wherein in the step of attaching the optical films in the sealant framework, a first polarizer, a prism film and a diffuser are placed in the sealant framework in sequence and are attached together by lamination.

10. The manufacturing method of a display device of claim 9, wherein the first polarizer comprises a polarizing layer and supporting layers arranged on both sides of the polarizing layer.

11. The manufacturing method of a display device of claim 9, wherein it further comprises:
coating an optical adhesive on the first display substrate before placing the first polarizer in the sealant framework.

12. The manufacturing method of a display device of claim 11, wherein the thickness of the optical adhesive is not less than 10 microns.

13. The manufacturing method of a display device of claim 11, wherein the thickness of the optical adhesive is not greater than 100 microns.

14. The manufacturing method of a display device of claim 8, wherein the sealant comprises glass cement.

15. The manufacturing method of a display device of claim 8, wherein the sealant comprises vanadium pentoxide.

* * * * *